United States Patent
Okano et al.

(10) Patent No.: US 12,252,152 B2
(45) Date of Patent: Mar. 18, 2025

(54) VEHICLE CONTROL DEVICE INCLUDING CONTROL BASED ON DETERMINED RUTS IN THE ROAD

(71) Applicant: TOYOTA JIDOSHA KABUSHIKI KAISHA, Toyota (JP)

(72) Inventors: Takahiro Okano, Chiryu (JP); Toru Takashima, Susono (JP); Shun Maruyama, Susono (JP); Shun Mizoo, Zama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 224 days.

(21) Appl. No.: 18/090,655

(22) Filed: Dec. 29, 2022

(65) Prior Publication Data

US 2023/0256989 A1   Aug. 17, 2023

(30) Foreign Application Priority Data

Feb. 16, 2022 (JP) ................................ 2022-021927

(51) Int. Cl.
*B60W 60/00* (2020.01)
*B60W 40/06* (2012.01)

(52) U.S. Cl.
CPC .......... *B60W 60/001* (2020.02); *B60W 40/06* (2013.01); *B60W 2420/408* (2024.01)

(58) Field of Classification Search
None
See application file for complete search history.

(56) References Cited

U.S. PATENT DOCUMENTS

| | | | |
|---|---|---|---|
| 2015/0353095 A1* | 12/2015 | Freess | B60W 50/14 701/1 |
| 2019/0367003 A1 | 12/2019 | Okada et al. | |
| 2020/0279481 A1* | 9/2020 | Kondo | G08G 1/0969 |
| 2022/0266858 A1* | 8/2022 | Taniguchi | B62D 15/0255 |
| 2022/0332306 A1* | 10/2022 | Noma | B62D 15/0265 |

FOREIGN PATENT DOCUMENTS

| | | | |
|---|---|---|---|
| EP | 3354541 A1 * | 8/2018 | |
| JP | 2008-293205 A | 12/2008 | |
| JP | 2019-175020 A | 10/2019 | |
| JP | 2019-209763 A | 12/2019 | |
| JP | 2020-140535 A | 9/2020 | |

* cited by examiner

*Primary Examiner* — James J Lee
*Assistant Examiner* — Andrew Sang Kim
(74) *Attorney, Agent, or Firm* — Sughrue Mion, PLLC

(57) ABSTRACT

A vehicle control device includes: a steering device, a steering control device, a surroundings monitoring device, and a controller. The controller is configured to execute: a route calculating process of calculating a target route, a trajectory calculating process of calculating a target trajectory of an own vehicle in one or more roads of the target route; a steering-angle calculating process of calculating a target steering angle; a behavior detecting process of detecting information on a behavior of the own vehicle; a rut determining process of determining presence or absence of a rut on the target trajectory based on a detection result obtained by the surroundings monitoring device and/or a detection result obtained in the behavior detecting process, a drivable or non-drivable determining process of determining whether the own vehicle is drivable over the rut, and a correcting process of correcting the target trajectory and/or the target route.

7 Claims, 4 Drawing Sheets

VEHICLE FRONT SIDE

LEFT ↔ RIGHT

VEHICLE REAR SIDE

VEHICLE CONTROL DEVICE INCLUDING CONTROL BASED ON DETERMINED RUTS IN THE ROAD

CROSS REFERENCE TO RELATED APPLICATION

The present application claims priority to Japanese Patent Application No. 2022-021927, which was filed on Feb. 16, 2022, the disclosure of which is herein incorporated by reference in its entirety.

BACKGROUND

Technical Field

The following disclosure relates to a vehicle control device.

Description of Related Art

A vehicle control device is disclosed in Japanese Patent Application Publication No. 2019-209763, for instance. The disclosed vehicle control device employs a technique of changing distribution of a drive force to wheels in a case where ruts are present on a road surface ahead of a vehicle in its traveling direction. In the disclosed vehicle control device, a two-wheel drive state is switched to a four-wheel drive state in the case where the ruts are present ahead of the vehicle in the traveling direction, thus enabling the vehicle to smoothly drive over or get over the ruts.

SUMMARY

In a situation in which an own vehicle is traveling on a snowy ordinary road along ruts formed by a preceding vehicle whose width is substantially the same as the width of the own vehicle, for instance, it is considered that the own vehicle can smoothly get out of the ruts by changing the distribution of the drive force. There is, however, a possibility that the own vehicle cannot drive over the ruts with high protruding portions merely by changing the distribution of the drive force. For instance, the ruts formed on an unpaved road by a large dump truck may be equivalent to curbs or walls for a passenger vehicle.

Accordingly, an aspect of the present disclosure relates to a vehicle control device capable of appropriately dealing with ruts on a road in automated driving.

In one aspect of the present disclosure, a vehicle control device includes: a steering device configured to steer one or more wheels; a steering control device configured to control the steering device based on a target steering angle; a surroundings monitoring device configured to monitor surroundings of an own vehicle; and a controller including one or more processors. The controller is configured to execute: a route calculating process in which the controller calculates a target route indicating one or more roads on which the own vehicle travels before arriving at a destination, based on map data, positional information of the own vehicle, and information on the destination; a trajectory calculating process in which the controller calculates, in automated driving, a target trajectory of the own vehicle in the one or more roads of the target route, based on a detection result obtained by the surroundings monitoring device; a steering-angle calculating process in which the controller calculates the target steering angle based on the target trajectory; a behavior detecting process in which the controller detects information on a behavior of the own vehicle; a rut determining process in which the controller determines presence or absence of a rut on the target trajectory based on the detection result obtained by the surroundings monitoring device, a detection result obtained in the behavior detecting process, or both the detection result obtained by the surroundings monitoring device and the detection result obtained in the behavior detecting process; a drivable or non-drivable determining process in which, when the controller determines in the rut determining process that the rut is present on the target trajectory, the controller determines whether it is possible for the own vehicle to drive over the rut, based on the detection result obtained by the surroundings monitoring device, the target trajectory, and the detection result obtained in the behavior detecting process; and a correcting process in which, when the controller determines in the drivable or non-drivable determining process that it is impossible for the own vehicle to drive over the rut, the controller corrects the target trajectory, the target route, or both the target trajectory and the target route.

In the vehicle control device according to the present disclosure, when the controller determines that it is impossible for the own vehicle to drive over the rut in automated driving, the target trajectory and/or the target route is corrected or changed. The change of the target trajectory or the target route enables the own vehicle to easily drive over the rut by bringing an approaching angle of the own vehicle with respect to the rut closer to 90 degrees or enables selection of a route that permits the own vehicle to arrive at the destination without driving over the rut, for instance. That is, the vehicle control device according to the present disclosure is capable of appropriately dealing with the rut on the road in automated driving.

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which.

DETAILED DESCRIPTION OF THE EMBODIMENT

Figure 1:
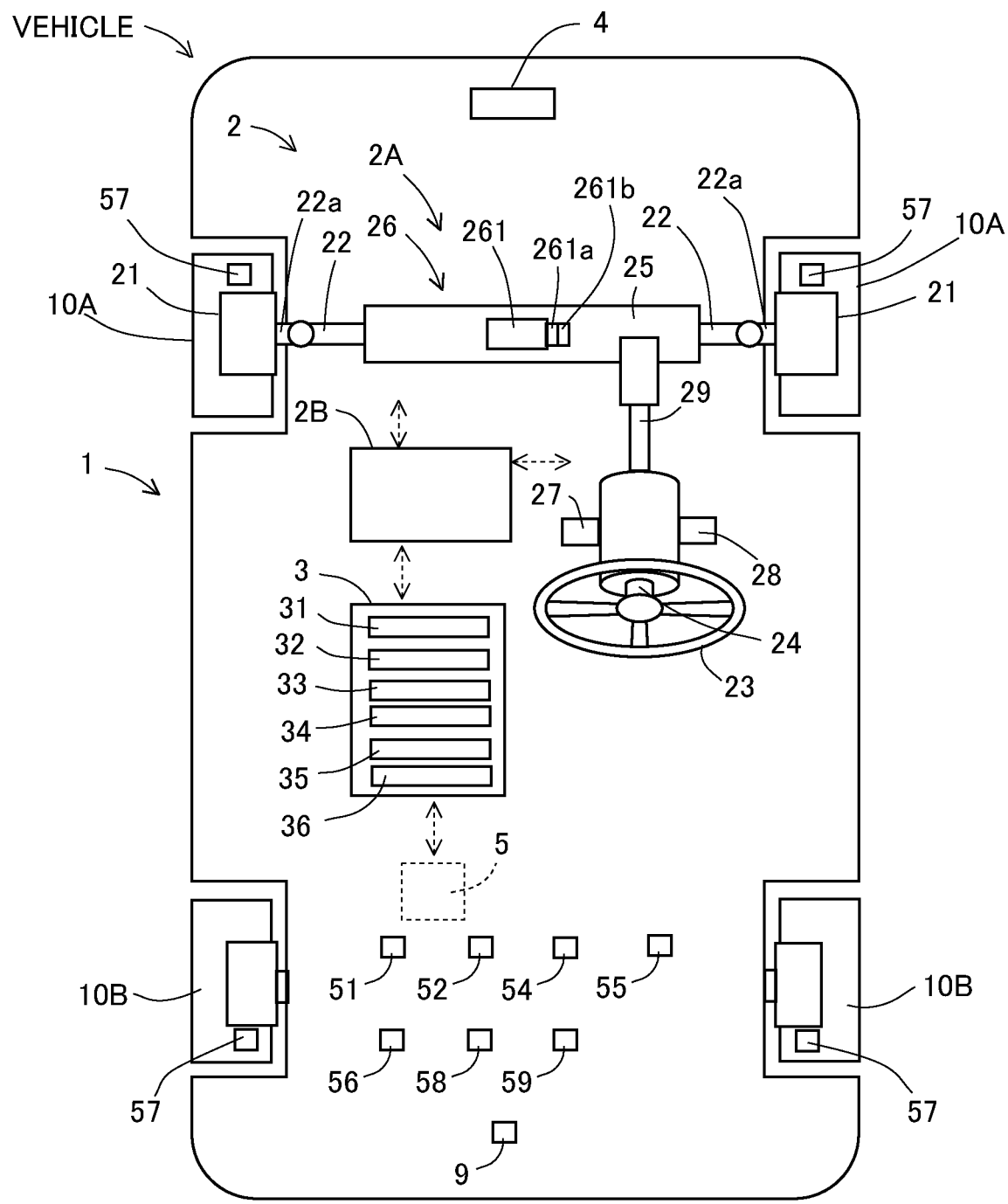
FIG. 1 a view illustrating a configuration of a vehicle control device according to one embodiment.

Referring to the drawings, there will be described below in detail a vehicle control device 1 according to one embodiment of the present disclosure. It is to be understood that the present disclosure is not limited to the details of the following embodiment but may be embodied with various changes and modifications based on the knowledge of those skilled in the art.

The vehicle control device 1 according to the present embodiment includes a steering system 2, an automated driving ECU 3 (corresponding to "controller"), a surroundings monitoring device 4, and a behavior detecting portion 5. The steering system 2 includes a steering device 2A and a steering ECU (corresponding to "steering control device") 2B. The steering device 2A is configured to steer front right and left wheels 10A, which are steerable wheels. The steering device 2A is electric power steering. The steering device 2A includes: a pair of steering knuckles 21; a steering rod 22; a steering wheel 23, which is a steering operation member; a steering shaft 24; a motion converting mechanism 25; a steering actuator 26; an operation angle sensor 27; and an operation force sensor 28.

The steering knuckles 21 respectively hold the front wheels 10A such that the front wheels 10A are rotatable. The steering rod 22 is connected at opposite ends thereof to the respective steering knuckles 21 via respective tie rods 22a. The steering shaft 24 rotates integrally with the steering wheel 23. The motion converting mechanism 25 is a rack and pinion mechanism for converting a rotating motion of the steering shaft 24 to a linear movement of the steering rod 22 in the right-left direction. The steering actuator 26 is configured to apply, to the steering rod 22, a force by which the steering rod 22 is moved in the right-left direction. (This force may be referred to as an axial force.). The steering actuator 26 includes a steering motor 261 configured to apply the axial force to the steering rod 22.

The operation angle sensor 27 is configured to detect a steering operation angle (hereinafter simply referred to as "operation angle" where appropriate), which is an operation amount of the steering wheel 23. The operation force sensor 28 is configured to detect a torsional amount of a torsion bar (not illustrated) provided for the steering shaft 24. The torsional amount is generated by a steering operation of the driver. In other words, the operation force sensor 28 is configured to detect an operation torque that is an operation force applied by the driver to the steering wheel 23.

The steering ECU 2B is an electronic control unit including a CPU, a memory, etc. The steering ECU 2B is configured to control the steering device 2A. The steering ECU 2B sets a control current value (hereinafter referred to as "assist current value" where appropriate) to be supplied to the steering motor 261, based on the operation torque and the direction of the operation detected by the operation force sensor 28 (and further based on vehicle-speed information, for instance). The steering ECU 2B supplies the control current corresponding to the assist current value to the steering motor 261. An actual steering angle (steering amount) of the front wheel 10A is estimated based on a detection value of a rotational angle sensor 261a provided for the steering motor 261. The assist current value is detected by a current sensor 261b provided for the steering motor 261.

The automated driving ECU 3 is an electronic control unit including a CPU, a memory, etc. The CPU includes one or more processors and performs various calculations that will be later described. The automated driving ECU 3 can calculate a positional relationship between an own vehicle and an object present in surroundings of the own vehicle based on a detection result of the surroundings monitoring device 4 and map data (such as three-dimensional map data). The automated driving ECU 3 will be later described in detail.

The surroundings monitoring device 4 is configured to monitor the surroundings of the own vehicle. The surroundings monitoring device 4 includes, for instance, one or more cameras for taking images of the surrounding of the vehicle and a millimeter-wave radar and a lidar (LiDAR: Light Detection and Ranging or Laser Imaging Detection and Ranging) for measuring a distance between the vehicle and the object present in the surrounding of the vehicle. The surroundings monitoring device 4 may be referred to as a device for measuring the distance between the own vehicle and the object present in the surroundings of the own vehicle for estimating the position of the own vehicle. The surroundings monitoring device 4 preferably includes the lidar in the light of the detection accuracy.

In automated driving, the steering ECU 2B sets the assist current value based on a target steering angle received from the automated driving ECU 3 and supplies, to the steering motor 261, the control current corresponding to the assist current value. Even when the steering wheel 23 is not operated, the steering device 2A is operated by the steering motor 261 to which the control current is applied. In automated driving, the front wheels 10A are steered without the steering wheel 23 being operated, in accordance with a target trajectory and the assist current value that is based on the target steering angle. The automated driving ECU 3 also calculates a target operation angle of the steering wheel 23 corresponding to the target steering angle.

In automated driving, the steering ECU 2B controls the steering device 2A based on the target steering angle received from the automated driving ECU 3. In manual driving, the steering ECU 2B controls the steering device 2A based on the operation of the steering wheel 23 performed by the driver. The automated driving ECU 3 sets, on the map data, the target route and the target trajectory in automated driving and transmits the target steering angle based on the target trajectory to the steering ECU 2B in automated driving.

Sensors

The vehicle includes various sensors such as a longitudinal acceleration sensor 51 for detecting acceleration of the vehicle in the front-rear direction of the vehicle, the surroundings monitoring device 4 for monitoring the surroundings of the vehicle, a lateral acceleration sensor 52 for detecting acceleration of the vehicle in the right-left direction, a yaw rate sensor 54 for detecting a yaw rate of the vehicle, a roll rate sensor 55 for detecting a roll rate of the vehicle, a pitch rate sensor 56 for detecting a pitch rate of the vehicle, wheel speed sensors 57 for detecting wheel speeds of the respective wheels 10A, 10B, a vertical acceleration sensor 58 for detecting acceleration of the vehicle in the up-down direction, and a suspension stroke sensor 59 for detecting a stroke of each shock absorber. The vehicle speed can be estimated based on detection results of the wheel speed sensors 57, for instance.

The sensors described above are communicably connected to the ECUs such as the steering ECU 2B and the automated driving ECU 3. In-vehicle communication is performed by a CAN (car area network or controllable area network). Sensors corresponding to a behavior detecting portion 5 (configured to detect information on a behavior of the own vehicle in determination of the presence or absence of a rut) include the longitudinal acceleration sensor 51, the lateral acceleration sensor 52, the yaw rate sensor 54, the wheel speed sensors 57, the current sensor 261b, the roll rate sensor 55, the pitch rate sensor 56, the vertical acceleration sensor 58, and the suspension stroke sensor 59. The behavior detecting portion 5 will be later described.

The automated driving ECU 3 includes, as functional portions, a route calculating portion 31, a trajectory calculating portion 32, a steering angle calculating portion 33, a rut determining portion 34, a drivable or non-drivable determining portion 35, and a correcting portion 36. Processes executed by those portions 32-36 are actually executed by the automated driving ECU 3. For convenience of the description, functions of the automated driving ECU 3 are represented as those portions 32-36. The route calculating portion 31 calculates the target route indicating road or roads over which the own vehicle travels before arriving at a destination, based on the map data, positional information of the own vehicle, and information on the destination. The map data is stored, for instance, in a storage medium with which the automated driving ECU 3 is communicable. (The storage medium may be an external device.) The positional information of the own vehicle is positional information about the own vehicle measured by a global positioning system (GPS). The vehicle is equipped with a GPS receiver 9 (GPS function). The destination is set by a user, for instance. The route calculating portion 31 calculates the target route based on a predetermined condition such as selection of the shortest route. The route calculating portion 31 may be configured to calculate a plurality of target routes and permit the user to select one of the plurality of target routes. The route calculating portion 31 have the same functions as a known navigation system, for instance.

The trajectory calculating portion 32 calculates, in automated driving, the target trajectory of the own vehicle in one or more roads that constitute the target route based on the detection result of the surroundings monitoring device 4. The target trajectory may be considered as information on target passing points of the own vehicle in the one or more roads of the target route (including paved roads and unpaved roads). For instance, the target trajectory is calculated in accordance with recognition of a white line on a road, other vehicle, or a pedestrian based on the detection result of the surroundings monitoring device 4. It may be considered that the target route indicates the road or roads on which the own vehicle travels, and it may be considered that the target trajectory is a locus of the target passing points of the own vehicle in the road or roads.

The steering angle calculating portion 33 calculates the target steering angle based on the target trajectory. The steering angle calculating portion 33 calculates the target steering angle corresponding to the position of the own vehicle, such that a traveling trajectory of the own vehicle is along the target trajectory, namely, such that the traveling trajectory of the own vehicle follows the target trajectory. The steering angle calculating portion 33 calculates the target steering angle (command value) to be transmitted to the steering ECU 2B based on an FF target angle calculated according to a feedforward control and an FB target angle calculated according to a feedback control, for instance. The FF target angle is an angle corresponding to the curvature of the target trajectory, for instance. The FB target angle is an angle based on: a lateral deviation that is a deviation of the position of the own vehicle in the right-left direction with respect to the target trajectory; and a yaw angle deviation that is based on the target trajectory.

Determination of Presence or Absence of Rut

The rut determining portion 34 is configured to determine the presence or absence of a rut on the target trajectory based on the detection result of the surroundings monitoring device 4 and/or the detection result of the behavior detecting portion 5. Here, a rut is a track formed on a road by a wheel of a vehicle. Specifically, a rut is constituted by a groove or a recess and two protruding portions protruding upward on opposite sides of the groove. The rut determining portion 34 determines whether any rut is present on the target trajectory based on the detection result of the lidar (and the one or more cameras) of the surroundings monitoring device 4, namely, based on information on recognition of the position and shape of an object present in the surroundings of the own vehicle, for instance. The rut determining portion 34 determines the presence or absence of the rut based on a preset determination criterion. For instance, the criterion as to the presence or absence of the rut is whether the protruding portion of the rut that protrudes by a predetermined height from the road surface (or the bottom surface of the groove) extends on the road surface by not less than a predetermined distance.

The rut determining portion 34 can determine the presence or absence of the rut based on the detection result of the behavior detecting portion 5. For instance, the rut determining portion 34 determines the presence or absence of the rut based on a detection result of the current sensor 261b, which functions as the behavior detecting portion 5, namely, based on the assist current value supplied to the steering motor 261. The steering ECU 2B sets the assist current value such that a difference between the actual steering angle and the target steering angle becomes small. Thus, in a case where the difference between the actual steering angle and the target steering angle does not decrease due to the rut, the steering ECU 2B increases the assist current value to thereby increase the axial force (that may be referred to as a steering assist force or a motor torque). In a case where the vehicle drives across (drives over or gets over) the rut, the road surface resistance with respect to steering of the vehicle is greater, as compared with a case where the vehicle turns on a flat paved road. As a result, if the actual steering angle is the same, the assist current value is greater in the case where the vehicle drives over the rut than in the case where the vehicle turns on the flat paved road. That is, the assist current value and the axial force in attaining the target trajectory and the target steering angle vary depending on the condition of the road surface.

The rut determining portion 34 calculates a difference between a reference current value preset for the target steering angle and the detection result of the current sensor 261b and determines the presence or absence of the rut based on a comparison of the difference and a predetermined threshold. When the difference is not greater than the predetermined threshold, the rut determining portion 34 determines that no rut is present. When the difference is greater than the predetermined threshold, the rut determining portion 34 determines that the rut is present. The rut determining portion 34 may determine that the rut is present when a state in which the difference is greater than the predetermined threshold continues for not less than a predetermined length of time. In a case where the own vehicle unintentionally travels along the rut without driving over the rut, the difference is kept large for a certain length of time. This makes it possible for the rut determining portion 34 to determine whether the own vehicle and the rut are in contact with each other, namely, determine the presence or absence of the rut. Here, the target of detection by the behavior detecting portion 5 may be the axial force, in place of the assist current value. The axial force increases with an increase in the assist current value.

The rut determining portion 34 may determine the presence or absence of the rut based on other detection results of the behavior detecting portion 5 such as an amount of change in the yaw rate, an amount of change in the vertical acceleration, an amount of change in the lateral acceleration, an amount of change in the roll rate, an amount of change in the pitch rate, an amount of change in the suspension stroke, and an amount of change in each wheel speed. These values, i.e., these detection results, also change depending on the presence or absence of the rut.

The rut determining portion 34 can determine the presence or absence of the rut based on the detection result of the surroundings monitoring device 4 before the wheel is about to drive over the rut, i.e., before contacting the rut. Further, the rut determining portion 34 can determine the presence or absence of the rut based on the detection result of the behavior detecting portion 5 when the wheel is about to drive over the rut, i.e., after contacting the rut. In other words, the rut determining portion 34 is configured to be capable of executing a pre-contact determination (pre-determination) based on the detection result of the surroundings monitoring device 4 and a post-contact determination (post-determination) based on the detection result of the behavior detecting portion 5. Therefore, even if the rut determining portion 34 misses the presence of the rut in the pre-contact determination, the presence of the rut can be detected in the post-contact determination. As described above, the rut determining portion 34 determines the presence or absence of the rut based on the detection result of the surroundings monitoring device 4 and/or the detection result of the behavior detecting portion 5.

Determination as to Whether Vehicle is Drivable or Non-Drivable Over Rut

When the rut determining portion 34 determines that the rut is present, the drivable or non-drivable determining portion 35 determines whether it is possible for the own vehicle to drive over the rut, based on the detection result of the surroundings monitoring device 4, the target trajectory, and the detection result of the behavior detecting portion 5. When the rut determining portion 34 determines that the rut is present, the drivable or non-drivable determining portion 35 calculates the height of the protruding portion of the rut and the direction of extension of the rut based on the detection result of the surroundings monitoring device 4. The drivable or non-drivable determining portion 35 can calculate the height of the protruding portion of the rut with respect to the road surface and the direction of extension of the rut along the road surface, based on the detection results of the lidar (and the one or more cameras) of the surroundings monitoring device 4. It is noted, however, that the accuracy of calculating or estimating the height of the protruding portion of the rut and the direction of extension of the rut may differ depending on the functional level of the surroundings monitoring device 4, etc.

The drivable or non-drivable determining portion 35 determines whether it is possible for the own vehicle to drive over the rut, in other words, whether to be drivable or non-drivable over the rut, based on the height of the protruding portion of the rut, an approach angle of the own vehicle with respect to the rut in the current target trajectory, the speed of the own vehicle, and acceleration of the own vehicle. If the target trajectory (i.e., the traveling direction of the own vehicle) and the direction of extension of the rut can be grasped, it is possible to calculate the approach angle of the own vehicle with respect to the rut, namely, it is possible to calculate an angle of intersection between the direction of extension of the rut and the target trajectory (hereinafter referred to as "intersection angle" where appropriate).

For instance, the closer the approach angle is to 90 degrees, the easier it is for the own vehicle to drive over the rut. For instance, the higher the vehicle speed immediately before the own vehicle comes into contact with the rut, the easier it is for the own vehicle to drive over the rut. For instance, the greater the forward acceleration of the own vehicle immediately before the own vehicle comes into contact with the rut, the easier it is for the own vehicle to drive over the rut. The higher the vehicle speed or the greater the acceleration, the greater the force for driving over the rut and the higher the possibility that the own vehicle travels while breaking the rut. Thus, the drivable or non-drivable determining portion 35 determines whether the own vehicle can drive over the rut based on the height of the protruding portion of the rut, the approach angle, and at least one of the vehicle speed and the acceleration. Hereinafter, the factors (i.e., the approach angle, the vehicle speed, and the acceleration), other than the height of the protruding portion of the rut, utilized in the determination as to whether to be drivable or non-drivable over the rut will be referred to as "drivable or non-drivable determining factors" where appropriate.

The drivable or non-drivable determining portion 35 may include a map representing a relationship among i) the height of the protruding portion of the rut, ii) the drivable or non-drivable determining factors, and iii) whether to be drivable or non-drivable over the rut. Further, based on the height of the protruding portion of the rut and the approach angle, the drivable or non-drivable determining portion 35 may calculate, utilizing the map or the like, a threshold vehicle speed and/or threshold acceleration. Here, the threshold vehicle speed is, for instance, a minimum vehicle speed that enables the own vehicle to drive over the rut, and the threshold acceleration is, for instance, minimum acceleration that enables the own vehicle to drive over the rut. In this configuration, when an expected maximum vehicle speed (e.g., a feasible maximum vehicle speed) when reaching the rut is less than the threshold vehicle speed, for instance, the drivable or non-drivable determining portion 35 determines that the own vehicle cannot drive over the rut. When expected maximum acceleration (e.g., feasible maximum acceleration) when reaching the rut is less than the threshold acceleration, the drivable or non-drivable determining portion 35 determines that the own vehicle cannot drive over the rut. The drivable or non-drivable determining factors may include a drive force of each wheel and the distribution of the drive force to the wheels (e.g., the two-wheel drive state or the four-wheel drive state). That is, the drivable or non-drivable determining portion 35 may determine whether the own vehicle can drive over the rut based on the drive force of each wheel and the distribution of the drive force.

For instance, the drivable or non-drivable determining portion 35 may determine whether the own vehicle can drive over the rut by comparing a threshold that is set for the height of the protruding portion of the rut and a score that is based on the drivable or non-drivable determining factors. For instance, the higher the protruding portion of the rut, the greater the threshold. In this instance, the closer the approach angle is to 90 degrees, the higher the score. Further, the higher the expected maximum vehicle speed, the higher the score. Further, the greater the expected acceleration, the higher the score. When a sum of the scores of the drivable or non-drivable determining factors is less than the threshold, for instance, the drivable or non-drivable determining portion 35 determines that the own vehicle cannot drive over the rut. When the sum is not less than the threshold, for instance, the drivable or non-drivable determining portion 35 determines that the own vehicle can drive over the rut. Further, in a case where the drive force and/or the distribution of the drive force is included in the drivable or non-drivable determining factors, the score is higher with an increase in the drive force, and the score is higher in the four-wheel state than in the two-wheel drive state. The drivable or non-drivable determining factors each added as the score are suitably settable.

When the rut determining portion 34 determines the presence of the rut based on the detection result of the behavior detecting portion 5, the drivable or non-drivable determining portion 35 may determine whether the own vehicle can drive over the rut based on the detection result of the behavior detecting portion 5 obtained when the own vehicle is about to drive over the rut. For instance, the drivable or non-drivable determining portion 35 may determine whether the own vehicle can drive over the rut based on the detection result of the current sensor 261b (i.e., the assist current value) or the motor torque at the time when the own vehicle is about to drive over the rut. When the assist current value at the time when the own vehicle is about to drive over the rut is equal to a maximum value of the assist current value set in advance, for instance, the drivable or non-drivable determining portion 35 determines that the own vehicle cannot drive over the rut. In this instance, the drivable or non-drivable determining portion 35 need not calculate the height of the protruding portion of the rut and the direction of extension of the rut. The drivable or non-drivable determining portion 35 may estimate the height of the protruding portion of the rut based on the assist current value. The drivable or non-drivable determining portion 35 may estimate the direction of extension of the rut as a direction in which the road extends, in consideration of road conditions. The drivable or non-drivable determining portion 35 may determine whether own vehicle can drive over the rut based on other detection result of the behavior detecting portion 5. The plurality of determination methods described above may be suitably modified.

Correction of Target Trajectory or Target Route

When the drivable or non-drivable determining portion 35 determines that the own vehicle cannot drive over the rut, the correcting portion 36 corrects at least one of the target trajectory and the target route. The correcting portion 36 in the present embodiment corrects the target trajectory such that the angle of intersection between the target trajectory and the rut in one or more of the roads of the target route is closer to 90 degrees after correction than before correction. The correcting portion 36 in the present embodiment first attempts to correct the target trajectory. The intersection angle, namely, the approach angle of the own vehicle with respect to the rut, can be represented by an acute angle and an obtuse angle unless the intersection angle is 90 degrees. In the present embodiment, the intersection angle is represented by an acute angle.

Figure 2:
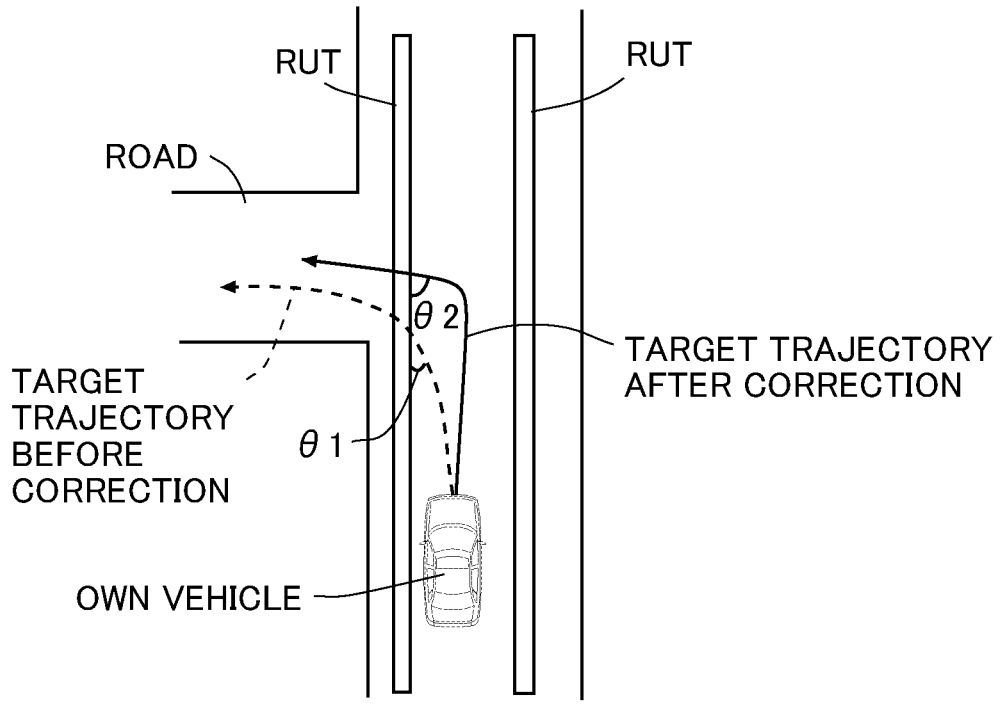
FIG. 2 is a conceptual view illustrating an example of correcting a target trajectory in the embodiment.
Figure 3:
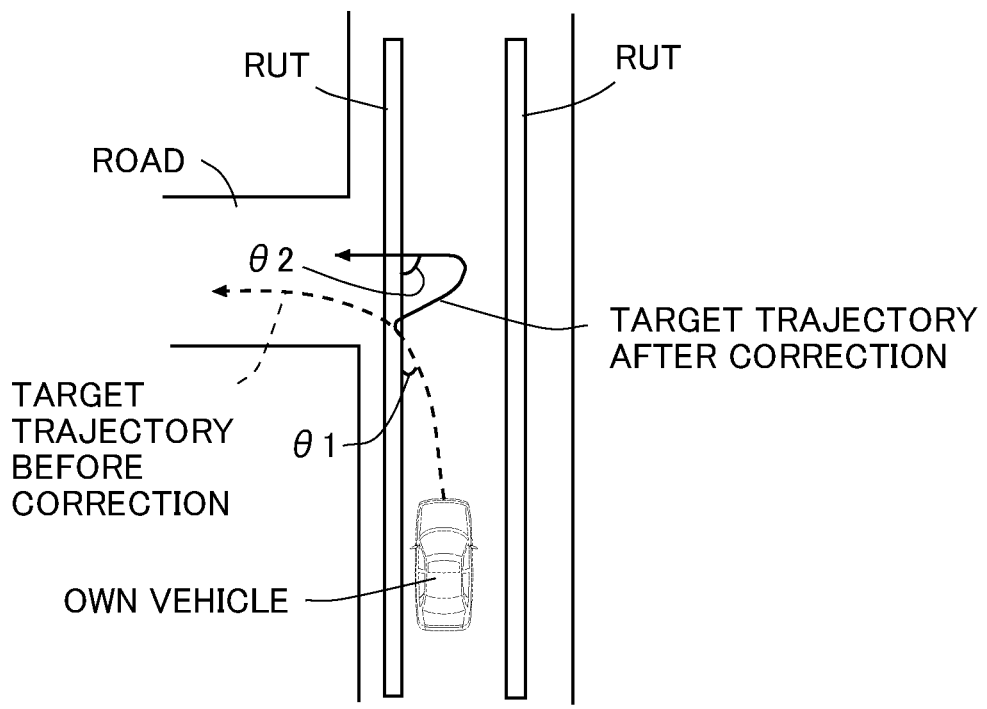
FIG. 3 is a conceptual view illustrating another example of correcting the target trajectory in the embodiment.

As illustrated in FIGS. 2 and 3, when the correcting portion 36 corrects the target trajectory, an intersection angle θ1 between the rut and the target trajectory before correction is changed to an intersection angle θ2 after correction. The intersection angle θ2 is greater than θ1 and is less than or equal to 90 degrees (θ1<θ2≤90 degrees). FIG. 2 illustrates an example in which the rut determining portion 34 determines that the rut is present according to the determination based on the detection result of the surroundings monitoring device 4 (the pre-contact determination), the drivable or non-drivable determining portion 35 determines that the own vehicle cannot drive over the rut, and the correcting portion 36 corrects the target trajectory. FIG. 3 illustrates an example in which the rut determining portion 34 determines that the rut is present according to the determination based on the detection result of the behavior detecting portion 5 (the post-contact determination), the drivable or non-drivable determining portion 35 determines that the own vehicle cannot drive over the rut, and the correcting portion 36 corrects the target trajectory.

For achieving the corrected target trajectory, the automated driving ECU 3 may accelerate or decelerate the own vehicle. For instance, the automated driving ECU 3 may decelerate the own vehicle for enabling the own vehicle to turn in a small radius. For achieving the target trajectory, the automated driving ECU 3 transmits i) the target steering angle and ii) target deceleration (target braking force) or target acceleration to the corresponding control device (such as the steering ECU 2B). Thus, the correcting portion 36 calculates the target trajectory such that the target trajectory is feasible by the steering control and the acceleration/deceleration control of the own vehicle and such that the intersection angle θ2 is closer to 90 degrees or becomes equal to 90 degrees. It is noted that a plurality of target trajectories may be calculated.

The correcting portion 36 performs, with a higher priority, the calculation for correcting the target trajectory (that may be referred to as correction calculation or calculation relating to the correction). In the correction calculation, if there are no target trajectories for which it is determined that the own vehicle can drive over the rut, among the target trajectories feasible in view of the status of the own vehicle (such as the vehicle speed and the road width), the correcting portion 36 corrects the target route. In other words, when the drivable or non-drivable determining portion 35 determines that the own vehicle cannot drive over the rut, the correcting portion 36 performs the correction calculation of the target trajectory with a higher priority. When the result of the calculation reveals that the own vehicle cannot drive over the rut even if the own vehicle travels along the corrected target trajectory, the correcting portion 36 corrects the target route. In the correction calculation, the correcting portion 36 in the present embodiment refers to information on physical limits such as information on the road width that is based on the map data or the detection result of the surroundings monitoring device 4 and information as to the presence of other ruts on the road.

As described above, the correcting portion 36 recalculates the target route when the currently set target route includes no target trajectories for which it is determined in the correction calculation that the own vehicle can drive over the rut. One example of the recalculation of the target route will be explained. In this example, the condition in the correction calculation is to change the intersection angle θ2 to 90 degrees. In a case where the intersection angle θ2 cannot be changed to 90 degrees in the correction calculation due to the limitation such as the road width even if the own vehicle is decelerated at maximum deceleration and is steered at a maximum steering angle, the correcting portion 36 calculates another target route. Further, in a case where the protruding portion of the rut is too high for the own vehicle to drive over the rut even if the intersection angle θ2 is 90 degrees, the correcting portion 36 calculates another target route.

Figure 4:
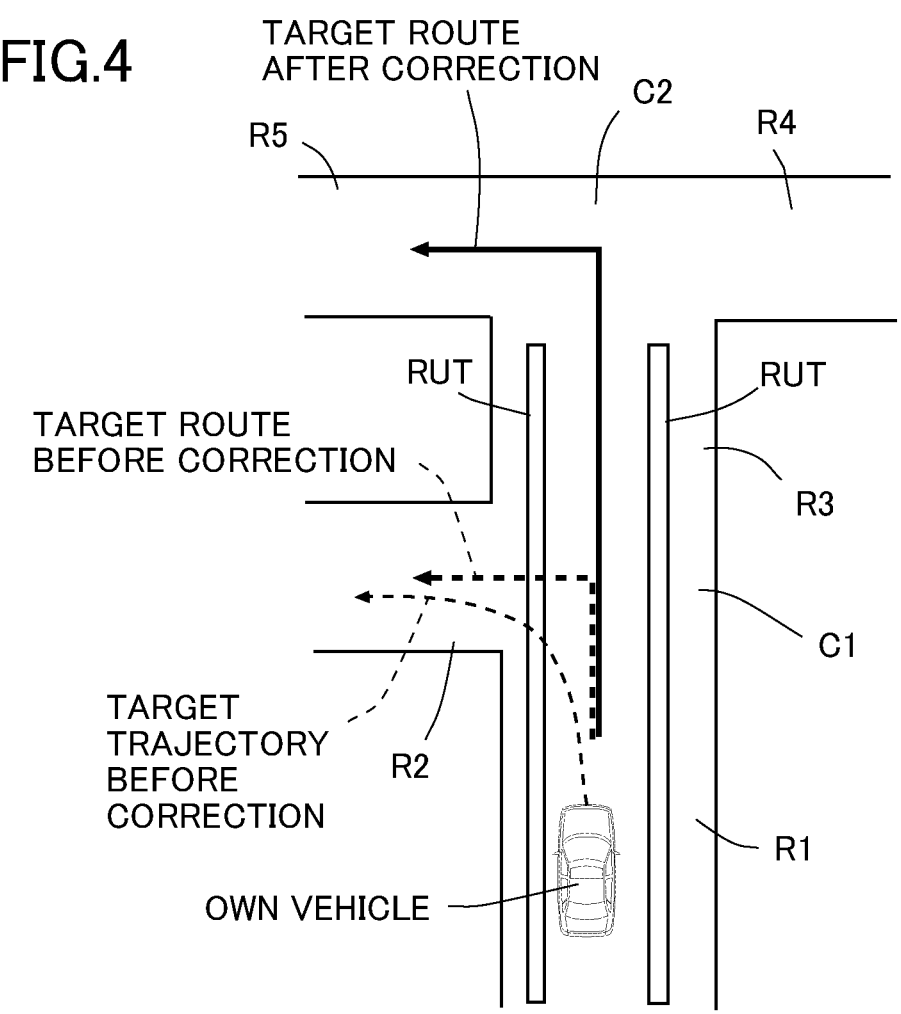
FIG. 4 is a conceptual view illustrating an example of correcting a target route in the embodiment.

In a case where it is possible to grasp the condition of the rut existing ahead of the own vehicle in the traveling direction (hereinafter simply referred to as "ahead of the own vehicle" where appropriate) based on the detection result of the surroundings monitoring device 4, for instance, the correcting portion 36 may calculate the target route for which it is determined that the own vehicle can drive over the rut or may calculate the target route for which there is no need for the own vehicle to drive over the rut. As illustrated in FIG. 4, in a case where the correcting portion 36 can recognize that the rut ends ahead of the vehicle, for instance, that is, in a case where only roads R4, R5 ahead of the own vehicle are paved roads, for instance, the correcting portion 36 corrects the target route to enable the own vehicle to turn left after the rut ends.

The target route before correction (roads R1, R2) and the target route after correction (roads R1, R3, R5) have different combinations of roads to be traveled and different intersections (C1, C2). In FIG. 4, one road is defined as the road surface from one intersection to another intersection (including the road surface at each intersection).

Even if the correcting portion 36 cannot recognize the condition of the rut existing ahead of the own vehicle, the correcting portion 36 sets another target route different from the currently set target route. This may result in the same situation as in FIG. 4. That is, even if the condition of the rut ahead of the own vehicle is unavailable, the correcting portion 36 calculates another target route different from the current target route and corrects or changes the current target route to the calculated target route. In a case where it again becomes necessary for the own vehicle to travel over the rut during traveling along the corrected target route, the correcting portion 36 again performs correction calculation to calculate the target trajectory. In a case where the correcting portion 36 can recognize at the stage of changing the target route that the rut in FIG. 4 extends into the intersection C2, namely, in a case where the correcting portion 36 can recognize at the stage of changing the target route that the own vehicle needs to drive over the rut at the intersection C2, the correcting portion 36 calculates in advance the target trajectory for which it is determined that the own vehicle can drive over the rut at the intersection C2. According to this configuration, the automated driving ECU 3 can, at an earlier stage, decelerate the own vehicle or change the target trajectory such that the own vehicle makes a wide turn with a large turn radius.

Figure 5:
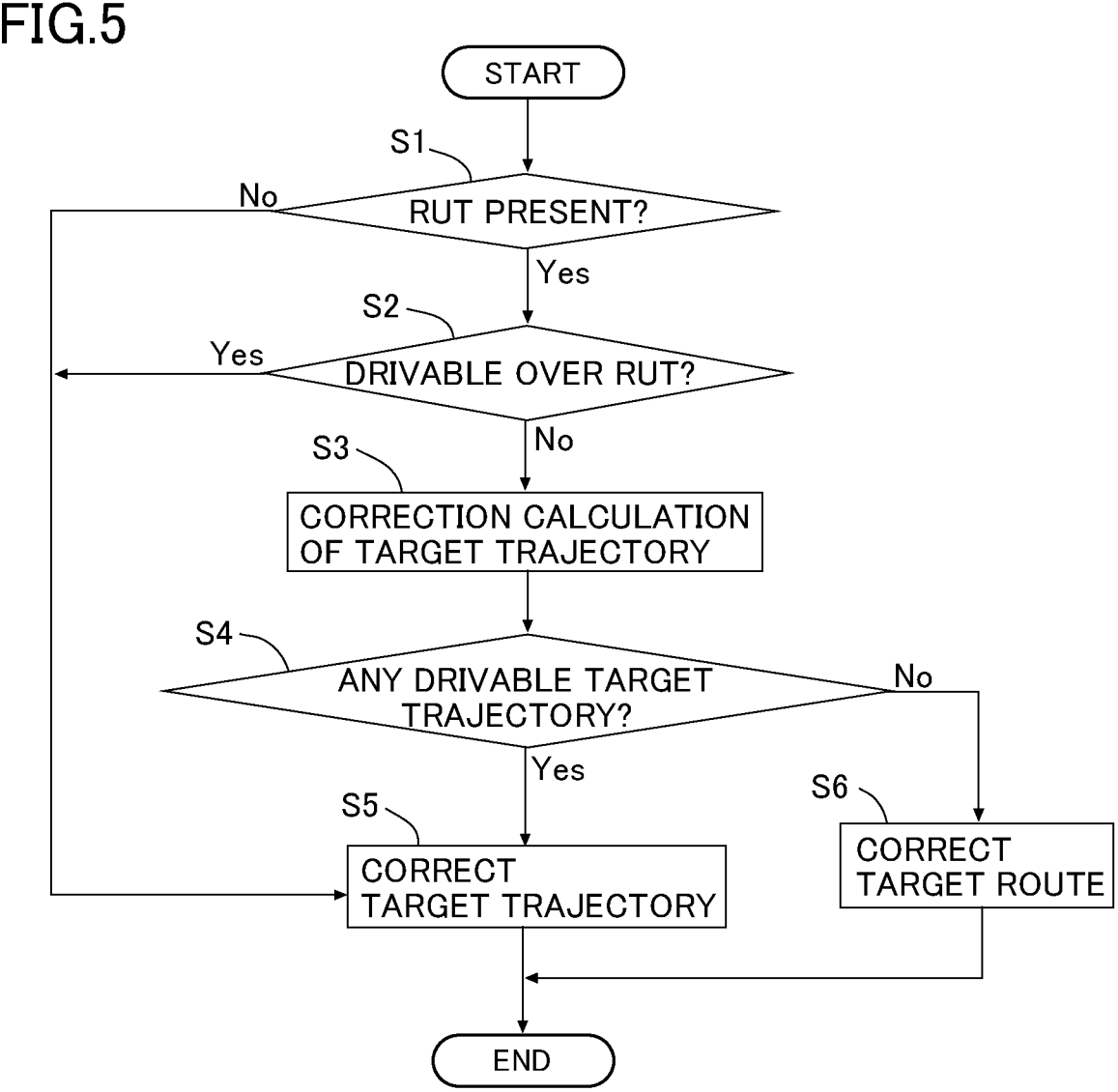
FIG. 5 is a flowchart illustrating a process of correcting the target trajectory or the target route in the embodiment.

Referring to FIG. 5, there will be described one example of a flow of a process of correcting the target trajectory or the target route. The automated driving ECU 3 determines during automated driving whether there is present any rut on the target trajectory (S1). When the automated driving ECU3 determines the presence of the rut on the target trajectory (S1: Yes), the automated driving ECU 3 determines whether it is possible for the own vehicle to drive over the rut if the own vehicle travels along the current target trajectory (S2). When the automated driving ECU3 determines that the own vehicle cannot drive over the rut (S2: No), the automated driving ECU3 performs the correction calculation of the target trajectory (S3). Specifically, the automated driving ECU 3 calculates the target trajectory such that the intersection angle θ2 after correction is close to or equal to 90 degrees. The automated driving ECU 3 incorporates, into the correction calculation, information on limits of acceleration/deceleration feasible for the own vehicle and information on the road width, etc.

When there are any target trajectory for which it is determined that the own vehicle can drive over the rut (S4: Yes), the automated driving ECU3 changes the current target trajectory to the calculated target trajectory (S5). For instance, the automated driving ECU 3 transmits, to the corresponding control devices, commands as to the target steering angle based on the corrected target trajectory, target acceleration/deceleration, the switchover to the four-wheel drive state, etc. When there are no target trajectories for which it is determined that the vehicle can drive over the rut (S4: No), on the other hand, the automated driving ECU 3 recalculates and corrects the target route (S6). When the target route is corrected, the target trajectory is set in accordance with the corrected target route.

When the automated driving ECU 3 determines the absence of the rut (S1: No) or when the automated driving ECU3 determines that the own vehicle can drive over the rut even when the rut is present on the target trajectory (S2: Yes), the automated driving ECU 3 maintains the current target trajectory and the current target route to continue automated driving. The automated driving ECU 3 repeats the processing at suitable intervals during automated driving.

According to the present embodiment, the target trajectory or the target route is corrected when it is determined that the own vehicle cannot drive over the rut in automated driving. The change of the target trajectory or the target route enables the own vehicle to easily drive over the rut by bringing the approaching angle of the own vehicle with respect to the rut closer to 90 degrees or enables selection of a route that permits the own vehicle to arrive at the destination without driving over the rut. That is, the vehicle control device according to the present disclosure is capable of appropriately dealing with the rut on the road in automated driving.

According to the present embodiment, the target trajectory is corrected such that the intersection angle θ2 is closer to or equal to 90 degrees. With this configuration, the own vehicle travels such that the traveling direction is orthogonal or nearly orthogonal with respect to the direction of extension of the rut, thus allowing the own vehicle to easily drive over the rut. When it is determined that the own vehicle cannot drive over the rut, the automated driving ECU 3 performs the correction calculation of the target trajectory with a higher priority. This makes it easy to maintain the target route (e.g., the shortest route), resulting in a reduction in loss of time due to detouring. When it is determined that the own vehicle cannot drive over the rut even if the target trajectory is corrected, the target route itself is changed, thus enhancing the probability of arriving at the destination.

The rut determining portion 34 in the present embodiment is configured to determine the presence or absence of the rut based on the detection result of the surroundings monitoring device 4 in a state in which the own vehicle and the rut are not in contact with each other and to determine whether the own vehicle and the rut are in contact with each other based on the detection result of the behavior detecting portion 5. With this configuration, the rut determining portion 34 can determine the presence or absence of the rut on the target trajectory both before and after contacting the rut.

In the present embodiment, the steering device 2A includes the steering motor 261 for steering the front wheels 10A, and the behavior detecting portion 5 includes the current sensor 261b for detecting the current value of the control current (the assist current value) to be supplied to the steering motor 261. The rut determining portion 34 calculates the difference between the reference current value set in advance for the target steering angle and the detection result of the current sensor 261b and determines the presence or absence of the rut based on a comparison of the difference and the predetermined threshold. With this configuration, should the vehicle control device 1 cannot find the rut based on the detection result of the surroundings monitoring device 4, the vehicle control device 1 can determine, based on the difference, the presence or absence of the rut after the wheel of the own vehicle has contacted the rut. That is, the vehicle control device 1 can correct at least one of the target trajectory and the target route after having contacted the rut.

The vehicle control device according to the present disclosure may be represented as follows.
  (1) A vehicle control device, including:
    a steering device configured to steer one or more wheels;

a steering control device configured to control the steering device based on a target steering angle;
a surroundings monitoring device configured to monitor surroundings of an own vehicle; and
a controller including one or more processors,
wherein the controller is configured to execute:
a route calculating process in which the controller calculates a target route indicating one or more roads on which the own vehicle travels before arriving at a destination, based on map data, positional information of the own vehicle, and information on the destination;
a trajectory calculating process in which the controller calculates, in automated driving, a target trajectory of the own vehicle in the one or more roads of the target route, based on a detection result obtained by the surroundings monitoring device;
a steering-angle calculating process in which the controller calculates the target steering angle based on the target trajectory;
a behavior detecting process in which the controller detects information on a behavior of the own vehicle;
a rut determining process in which the controller determines presence or absence of a rut on the target trajectory based on the detection result obtained by the surroundings monitoring device, a detection result obtained in the behavior detecting process, or both the detection result obtained by the surroundings monitoring device and the detection result obtained in the behavior detecting process;
a drivable or non-drivable determining process in which, when the controller determines in the rut determining process that the rut is present on the target trajectory, the controller determines whether it is possible for the own vehicle to drive over the rut, based on the detection result obtained by the surroundings monitoring device, the target trajectory, and the detection result obtained in the behavior detecting process; and
a correcting process in which, when the controller determines in the drivable or non-drivable determining process that it is impossible for the own vehicle to drive over the rut, the controller corrects the target trajectory, the target route, or both the target trajectory and the target route.

(2) The vehicle control device according to the form (1), wherein, when the controller determines in the rut determining process that the rut is present on the target trajectory, the controller calculates a height of a protruding portion of the rut and a direction of extension of the rut in the drivable or non-drivable determining process based on the detection result obtained by the surroundings monitoring device.

(3) The vehicle control device according to the form (1), wherein the controller corrects the target trajectory in the correcting process such that an angle of intersection between the target trajectory and the rut in the one or more roads of the target route is closer to 90 degrees after correction than before correction.

(4) The vehicle control device according to the form (1), wherein the controller corrects the target trajectory in the correcting process such that an angle of intersection between the target trajectory and the rut in the one or more roads of the target route is equal to 90 degrees.

(5) The vehicle control device according to the form (1), wherein, when the controller determines in the drivable or non-drivable determining process that it is impossible for the own vehicle to drive over the rut, the controller performs, in the correcting process, calculation for correcting the target trajectory with a higher priority to thereby correct the target trajectory, and
wherein, when a result of the calculation reveals that it is impossible for the own vehicle to drive over the rut even if the own vehicle travels along the corrected target trajectory, the controller corrects the target route.

(6) The vehicle control device according to the form (1), wherein the surroundings monitoring device includes a lidar.

(7) The vehicle control device according to the form (1), wherein, in the rut determining process, the controller determines the presence or absence of the rut based on the detection result obtained by the surroundings monitoring device in a state in which the own vehicle and the rut are not in contact with each other and determines whether the own vehicle and the rut are in contact with each other based on the detection result obtained in the behavior detecting process.

(8) The vehicle control device according to the form (7), wherein the steering device includes a steering motor for steering the one or more wheels,
wherein a current sensor is connected to the controller, the current sensor being utilized in the behavior detecting process and configured to detect a current value of a control current to be supplied to the steering motor, and
wherein, in the rut determining process, the controller
i) calculates a difference: between a reference current value set in advance for the target steering angle; and a detection result obtained by the current sensor and
ii) determines the presence or absence of the rut based on a comparison of the difference and a predetermined threshold.

MODIFICATIONS

The present disclosure is not limited to the details of the illustrated embodiment. For instance, the correcting portion 36 may perform the correction calculation of the target route with a higher priority. The correcting portion 36 may perform the correction calculation of the target route and the correction calculation of the target trajectory. The steering device may be provided for the rear wheels 10B. The steering system 2 may be a steer-by-wire steering system. The automated driving ECU 3 may be constituted by a plurality of ECUs. The roads include paved roads and unpaved roads. The rut include the one formed by soil and/or snow. The present disclosure is applicable more effectively to, for instance, automated driving of passenger vehicles in mines or the like where there are many unpaved roads on which the ruts are formed by heavy equipment or the like. The controller may be constituted by a plurality of ECUs. The controller may be constituted by one or more ECUs and one or more computers. The controller may be constituted by a plurality of computers.

What is claimed is:
1. A vehicle control device, comprising:
a steering device configured to steer one or more wheels;
a steering control device configured to control the steering device based on a target steering angle;

a surroundings monitoring device configured to monitor surroundings of an own vehicle; and
a controller including one or more processors,
wherein the controller is configured to execute:
   a route calculating process in which the controller calculates a target route indicating one or more roads on which the own vehicle travels before arriving at a destination, based on map data, positional information of the own vehicle, and information on the destination;
   a trajectory calculating process in which the controller calculates, in automated driving, a target trajectory of the own vehicle in the one or more roads of the target route, based on a detection result obtained by the surroundings monitoring device;
   a steering-angle calculating process in which the controller calculates the target steering angle based on the target trajectory;
   a behavior detecting process in which the controller detects information on a behavior of the own vehicle;
   a rut determining process in which the controller determines presence or absence of a rut on the target trajectory based on the detection result obtained by the surroundings monitoring device, a detection result obtained in the behavior detecting process, or both the detection result obtained by the surroundings monitoring device and the detection result obtained in the behavior detecting process;
   a drivable or non-drivable determining process in which, when the controller determines in the rut determining process that the rut is present on the target trajectory, the controller determines whether it is possible for the own vehicle to drive over the rut, based on the detection result obtained by the surroundings monitoring device, the target trajectory, and the detection result obtained in the behavior detecting process; and
   a correcting process in which, when the controller determines in the drivable or non-drivable determining process that it is impossible for the own vehicle to drive over the rut, the controller corrects the target trajectory, the target route, or both the target trajectory and the target route;
   wherein the controller corrects the target trajectory in the correcting process such that an angle of intersection between the target trajectory and the rut in the one or more roads of the target route is closer to 90 degrees after correction than before correction and transmits the target steering angle based on the corrected target trajectory to the steering control device.

2. The vehicle control device according to claim 1, wherein, when the controller determines in the rut determining process that the rut is present on the target trajectory, the controller calculates a height of a protruding portion of the rut and a direction of extension of the rut in the drivable or non-drivable determining process based on the detection result obtained by the surroundings monitoring device.

3. The vehicle control device according to claim 1,
   wherein, when the controller determines in the drivable or non-drivable determining process that it is impossible for the own vehicle to drive over the rut, the controller performs, in the correcting process, calculation for correcting the target trajectory with a higher priority to thereby correct the target trajectory, and
   wherein, when a result of the calculation reveals that it is impossible for the own vehicle to drive over the rut even if the own vehicle travels along the corrected target trajectory, the controller corrects the target route.

4. The vehicle control device according to claim 1, wherein the surroundings monitoring device includes a lidar.

5. The vehicle control device according to claim 1, wherein, in the rut determining process, the controller determines the presence or absence of the rut based on the detection result obtained by the surroundings monitoring device in a state in which the own vehicle and the rut are not in contact with each other and determines whether the own vehicle and the rut are in contact with each other based on the detection result obtained in the behavior detecting process.

6. The vehicle control device according to claim 5,
   wherein the steering device includes a steering motor for steering the one or more wheels,
   wherein a current sensor is connected to the controller, the current sensor being utilized in the behavior detecting process and configured to detect a current value of a control current to be supplied to the steering motor, and
   wherein, in the rut determining process, the controller i) calculates a difference: between a reference current value set in advance for the target steering angle; and a detection result obtained by the current sensor and ii) determines the presence or absence of the rut based on a comparison of the difference and a predetermined threshold.

7. A vehicle control device, comprising:
a steering device configured to steer one or more wheels;
a steering control device configured to control the steering device based on a target steering angle;
a surroundings monitoring device configured to monitor surroundings of an own vehicle; and
a controller including one or more processors,
wherein the controller is configured to execute:
   a route calculating process in which the controller calculates a target route indicating one or more roads on which the own vehicle travels before arriving at a destination, based on map data, positional information of the own vehicle, and information on the destination;
   a trajectory calculating process in which the controller calculates, in automated driving, a target trajectory of the own vehicle in the one or more roads of the target route, based on a detection result obtained by the surroundings monitoring device;
   a steering-angle calculating process in which the controller calculates the target steering angle based on the target trajectory;
   a behavior detecting process in which the controller detects information on a behavior of the own vehicle;
   a rut determining process in which the controller determines presence or absence of a rut on the target trajectory based on the detection result obtained by the surroundings monitoring device, a detection result obtained in the behavior detecting process, or both the detection result obtained by the surroundings monitoring device and the detection result obtained in the behavior detecting process;
   a drivable or non-drivable determining process in which, when the controller determines in the rut determining process that the rut is present on the target trajectory, the controller determines whether it is possible for the own vehicle to drive over the rut, based on the detection result obtained by the surroundings monitoring device, the target trajectory, and the detection result obtained in the behavior detecting process; and a correcting process in which, when the controller determines in the drivable or non-drivable determining process that it is impossible for the own vehicle to drive over the rut, the controller corrects the target trajectory, the target route, or both the target trajectory and the target route, wherein the controller corrects the target trajectory in the correcting process such that an angle of intersection between the target trajectory and the rut in the one or more roads of the target route is equal to 90 degrees and transmits the target steering angle based on the corrected target trajectory to the steering control device.

* * * * *